(12) United States Patent
Jeon

(10) Patent No.: US 6,225,369 B1
(45) Date of Patent: May 1, 2001

US006225369B1

(54) UV-CURABLE, ADHESIVE TRANSFER INK

(75) Inventor: Sang Bum Jeon, Seoul (KR)

(73) Assignee: Moltex Co., Ltd., Ansong-shi (KR)

( * ) Notice: Subject to any disclaimer, the term of this patent is extended or adjusted under 35 U.S.C. 154(b) by 0 days.

(21) Appl. No.: 09/352,631

(22) Filed: Jul. 13, 1999

(30) Foreign Application Priority Data

May 19, 1999 (KR) .................................................. 99-18004

(51) Int. Cl.[7] .................................. C08F 2/48; C08F 2/50
(52) U.S. Cl. .................................. 522/81; 522/71; 522/73; 522/75; 522/77; 522/78; 522/79; 522/81; 522/83; 522/84; 522/85; 522/86; 523/160; 106/31.6; 106/31.61; 106/31.63
(58) Field of Search .................................. 522/71, 73, 75, 522/77, 78, 79, 80, 81, 83, 84, 85, 86, 181, 111, 112, 120.12; 106/31.6, 31.61, 31.63; 523/160

(56) References Cited

U.S. PATENT DOCUMENTS

| | | | |
|---|---|---|---|
| 4,856,670 | * 8/1989 | Hang et al. | 220/2.1 A |
| 5,238,900 | * 8/1993 | Shuku | 503/207 |
| 5,693,693 | * 12/1997 | Auslander et al. | 524/88 |
| 5,789,123 | * 8/1998 | Cleckner et al. | 430/18 |
| 5,919,834 | * 7/1999 | Downs et al. | 522/33 |
| 5,932,643 | * 8/1999 | Kenny | 524/276 |
| 6,025,017 | * 2/2000 | Roth | 427/146 |
| 6,040,040 | * 5/2000 | Rainbow | 428/212 |

* cited by examiner

Primary Examiner—James J. Seidleck
Assistant Examiner—Sanza McClendon
(74) Attorney, Agent, or Firm—Jacobson, Price, Holman & Stern, PLLC

(57) ABSTRACT

Disclosed is a UV-curable transfer ink which can be cured by UV and used to emboss a precise and clear pattern on a substrate. It comprises 20–40% by weight of a UV-reactive ink, 20–40% by weight of an acrylic copolymer, 4–6% by weight of an ethylene vinyl acetate copolymer, 25–35% by weight of an organic solvent and 0.5–5% by weight of a bulking agent. A printing sheet is also provided, on which the transfer ink is printed in a predetermined pattern. An embossed pattern is obtained by applying the sheet to a substrate, exposing it to UV to cure the printed transfer ink, releasing the printing sheet to leave the cured transfer ink on the substrate, and etching the substrate.

5 Claims, No Drawings

UV-CURABLE, ADHESIVE TRANSFER INK

BACKGROUND OF THE INVENTION

1. Field of the Invention

The present invention relates, in general, to an adhesive transfer ink which is used in patterning a mold or a substrate and, more particularly, to a UV-curable, adhesive transfer ink which can be cured by UV, to serve as a mask during the etching of a molds or substrate to be embossed.

2. Description of the Prior Art

Etching is a technique for forming patterns or figures on molds or substrates, which is conventionally conducted as a single etching or multiple etching process. Typically, single etching comprises the steps of (a) pre-treating a substrate with diluted hydrochloric acid, (b) photoresist-coating, (c) photo-masking, (d) UV-irradiating, (e) developing, (f) pattern correction, (g) etching, (h) photoresist-removal and (i) surface treatment. The multiple etching process, developed to accomplish various patterns or figures on a substrate, is carried out by repeating steps (b) through (h) of the single etching process.

In the photoresist-coating step of the single or multiple etching process, photoresist is spray-coated or screen-coated on a substrate to which figures are transferred. Usually, it is difficult to uniformly coat photoresist. In the multiple etching process, an etched primary figure or pattern is coated with photoresist and the resultant is coated with a secondary figure or pattern-bearing film. At this time, however, the primary figure or pattern is not seen or exposed by the photoresist.

Also, conventional etching techniques suffer from a disadvantage in that UV is not uniformly irradiated on the surfaces of substrates or molds owing to their outward forms, so that developing defectives take place in a subsequent developing step, making it difficult to precisely form predetermined patterns or figures. When a developing defective occurs, it is necessary to correct the pattern, resulting in an increase in the number of the process steps.

In order to overcome such disadvantages, there has been introduced a water-transfer process in which, after a printing sheet bearing a predetermined pattern or figure is coated on a substrate, application of water allows the predetermined pattern or figure to transfer to the substrate. Then, the sheet is separated from the substrate and the pattern or figure remain alone. However, it is also difficult to obtain a desired pattern or figure because the printing sheet is overly sensitive to moisture.

SUMMARY OF THE INVENTION

The intensive and thorough research on the transfer of figures or patterns to substrates, performed by the present inventors, resulted in the finding that a precise and definite pattern can be embossed on a mold or a substrate by the use of a material which can be cured by UV is resistant to an etchant.

Therefore, it is an object of the present invention to overcome the above problems encountered in the prior art and to provide a UV-curable, adhesive transfer ink with the aid of which a pattern or patterns can be precisely and definitely embossed on a mold or a substrate.

It is another object of the present invention to provide a printing sheet on which a predetermined pattern is printed with the above UV-curable, adhesive transfer ink.

In accordance with one aspect of the present invention, there is provided a UV-curable transfer ink, which comprises 20–40% by weight of a UV-reactive ink, 20–40% by weight of an acrylic (co) polymer, 4–6% by weight of an ethylene vinyl acetate copolymer, 25–35% by weight of an organic solvent and 0.5–5% by weight of a bulking agent.

In accordance with another object of the present invention, there is provided a printing sheet, which comprises a polyethylene or polypropylene film which is screen-printed in a predetermined pattern with the transfer ink, and a silicon-coated, releasable polyethylene terephthalate backing laminated on the film.

DETAILED DESCRIPTION OF THE INVENTION

The present invention pertains to an adhesive transfer ink which allows figures or patterns to be transferred through a UV-curable mechanism. The adhesive transfer ink comprises a UV-reactive ink, an acrylic (co) polymer, an ethylene vinyl acetate (EVA) copolymer, a bulking agent, and an organic solvent.

The UV-reactive ink amounts to 20–40% by weight of the total weight of the adhesive transfer ink, and preferably to 25–35% by weight. For example, if the UV-reactive ink is used at an amount less than 20% by weight, deterioration is generated at the time of UV-curing, resulting in a poor transferred state. On the other hand, if the UV-reactive ink is over 40% by weight, the substrate is stained with the resulting adhesive transfer ink printed on a printing film.

The UV-reactive ink comprises 15–25% by weight of pigment, 3–4% by weight of polyethylene wax, 1.5–2.0% by weight of a bulking agent, 12–16% by weight of a curing agent, 15–25% by weight of polyester acrylate, 10–12% by weight of an acrylic monomer, 25–36% by weight of aliphatic urethane diacrylate, and 1.5–2.0% by weight of trimethylol propane triacrylate. Preferable is that commercially available from Dongyang Print Co., Korea, identified as Model "Hi-Cure".

For the pigment, there is exemplified cyanium blue (Songwon Color Co., Korea), toluidine red (Songwon Color Co., Korea) or carbon black.

Illustrative, but non-limitative examples of the bulking agent contained in the UV-reactive ink include aluminum oxide, silicon dioxide, mica, kaolin, talc, barium sulfate, potassium sulfate, alumina and silica.

Useful as the curing agent is dicycan diamide.

Concrete examples of the acrylic monomer contained in the UV-reactive ink include glycerolpropoxy triacrylate, pentaerythritol tetraacrylate, pentaerythritol pentaacrylate, bisphenol-A type dimethacrylate, polyethyleneglycol diacrylate, polypropyleneglycol diacrylate, diethyleneglycol diacrylate, triethyleneglycol diacrylate, and tripropyleneglycol diacaylate.

Functioning to provide an adhesive property to the transfer ink, the acrylic (co) polymer, exemplified by, for example, polyacrylic acid, acrylonitirile butadienestyrene, styreneacrylonitrile, acrylonitrile butadiene and natural rubber, preferably ranges, in quantity, from 20 to 40% by weight based on the total weight of the transfer ink. For instance, if the acrylic (co) polymer is used at an amount less than 20% by weight, the resulting ink transfer is poor in adhesiveness, leading to a deterioration in the transferred pattern or figure. On the other hand, when the acrylic (co) polymer is present at an amount greater than 40% by weight, the transferred ink is so viscous that, in screen printing, the mesh of the screen may become clogged.

In order to prevent the transfer ink from sagging while maintaining the adhesive property of the acrylic (co)

polymer, ethylene vinyl acetate is used in the present invention. The ethylene vinyl acetate is also useful to increase the ink tenacity and chemical resistance after the transfer ink is printed on a printing film. Amounting to 4–8% by weight based on the weight of the transfer ink, the ethylene vinyl acetate may be exemplified by modified ethylene vinyl acetate and carbonic acid vinyl compounds.

The organic solvent has a function of preventing the ink from unintentionally staining portions of the target, by providing a coating to the printed ink on the printing film through solvent evaporation. Examples of the organic solvent include toluene, cyclohexane, methyl salicylate, butyl acetate, ethyl acetate, amyl acetate, isopropyl alcohol, methyl isobutyl ketone, methyl ethyl ketone, dibutyl phthalate, xylene and benzene, with preference to toluene. The organic solvent is preferably 25–35% by weight based on the total weight of the transfer ink. For example, when the organic solvent is below 25% by weight, the mesh of the screen is clogged, so screen printing cannot be conducted continuously. In addition, the ink gels too fast. On the other hand, if the organic solvent is greater than 35% by weight, the transfer ink runs after printing.

Being identical to that for the UV-reactive ink, the bulking agent for the transfer ink is in the range of 0.5 to 5% by weight based on the total weight of the transfer ink. Less than 0.5% by weight of the bulking agent causes the transfer ink to spread, producing a poor printed state. On the other hand, where the bulking agent is used at an amount greater than 5% by weight, it is virtually impossible to perform a continuous printing process and the trace of the screen appears in the printed ink. Preferably, the bulking agent ranges, in particle size, from 200 to 900 mesh.

According to the present invention, the transfer ink is prepared by mixing the UV-reactive ink to a mixture of the acrylic (co) polymer, the EVA, the toluene and the bulking agent at a weight ratio of 20:80 to 50:50. If the UV-reactive ink is added at an amount less than 20% by weight, UV-curing is performed at a poor level. On the other hand, when the amount of the UV-reactive ink exceeds 80% by weight, the transfer ink is too dark to see the appearance of the mold therethrough. It is important that the transfer ink maintains a semi-transparent property.

In the case of transferring a dotted pattern to a mold, the weight ratio of the UV-reactive ink to the mixture of the acrylic (co) polymer, the EVA, the toluene and the bulking agent is preferably on the order of 20:80. For a line pattern, the weight ratio is preferably on the order of 40:60.

A function of the organic solvent is to control the viscosity of the transfer ink, which is preferably in the range of 3,000 to 15,000 cps.

Using the transfer ink of the present invention, a printing sheet is prepared as follows. First, the transfer ink is printed in a predetermined pattern through a 350 mesh screen on a printing film 20–30 μm thick, made typically of polyethylene or polypropylene. Then, a silicon-coated release paper 20–30 μm thick is laminated on the printing film, followed by extruding the laminate to give the printing sheet. Preferably, the release paper is made of polyethylene terephthalate (PET). The printed pattern obtained through the screen coating process preferably ranges, in thickness, from 7 to 15 μm. Of course, the pattern may be determined according to consumer desire.

The printing sheet prepared according to the present invention is useful to emboss the surfaces of automobile accessories, such as dash boards, handles, console boxes, sun visors and glove boxes, as well as household electric appliances and glass products. However, these are not set forth to limit the scope of the present invention.

A description will be given of a process for embossing the articles through the use of the above printing sheet. This process is typically composed of a pretreating step, a printing sheet-applying step, an exposing step, a printing sheet-removing step, a correcting step, an etching step and a polishing step. In detail, a target surface of a P/L mold is treated with a hydrochloric acid solution containing a surfactant and then, covered tightly with the printing film deprived of the release paper. Next, the printing film is exposed to a UV beam at a power of 1–3 kW for 30–60 sec, to cure the transfer ink printed in a predetermined pattern to a three-dimensional network structure. Thereafter, the printing film is removed leaving the predetermined pattern on the mold. Subsequently, if a pin hole or a disconnection is present in the patterns transferred to the mold, it is filled with the aid of a repair varnish. Next, an etching step is carried out in such a way that the mold is immersed in or sprayed with a mixture of nitric acid, ferric chloride and chloric acid. Alternatively, a roller etching process may be employed. Following the etching, the printed coating is removed and glass beads of 30–200 mesh in size are used to polish the mold.

In conventional embossing processes, as mentioned previously, a photoresist is sprayed on a mold which is then subjected to photomasking, exposing, and developing steps. In the course of this procedure, however, the pattern is not precisely achieved. For example, many pin holes may be formed, depending on the humidity of the atmosphere, forming a disconnected or unclear pattern. In contrast to conventional processes, the present invention does not comprise such steps. The printing sheet according to the present invention can be produced on a large scale at low costs and easily applied to desired positions of molds, so a significant reduction can be brought into the intensity of the work. In the present invention, the etching process is greatly simplified owing to the absence of a developing step. In addition, a single or multiple etching process can be accomplished in a rolling manner, conveniently.

A better understanding of the present invention may be obtained in light of the following examples which are set forth to illustrate, but are not to be construed to limit the present invention.

EXAMPLES

Examples of Transfer Ink Preparation

First, 15% by weight of an EVA copolymer was dissolved in toluene, stirring the solution at a temperature of 80° C. Then, 30% by weight of an acrylic (co) polymer and 2.8% by weight of a bulking agent, at a temperature of 40° C. or less, were added to 37.2% by weight of this solution, followed by 3-roll-milling to give a colloidal solution. Thereafter, 70% by weight of the colloidal solution was mixed with 30% by weight of "Hi-cure" UV-reactive ink for 5–10 min, with the aid of a low speed cowl mixer, to give a transfer ink.

Other transfer inks were prepared according to the indications shown in Table 1, below.

TABLE 1

| Components | EXAMPLE I | EXAMPLE II | EXAMPLE III |
| --- | --- | --- | --- |
| UV-Reactive Ink | 25 | 30 | 33 |
| Acrylic (Co)polymer | 25 | 30 | 30 |
| EVA | 8 | 7 | 5 |
| Toluene | 38 | 28 | 26 |
| Bulking Agent | 2 | 2 | 4 |

Test for Properties of the Transfer Inks

An examination was made of the physical and chemical properties of the transfer inks prepared in the above examples.

In this regard, the printing sheets on which patterns were printed with the transfer inks were attached to substrates and exposed to UV at a power of 1 kW for 30 sec. After the printing film was removed, the transfer inks were analyzed for their properties. The results are given in Table 2, below.

TABLE 2

| Test Items | EXAMPLE I | EXAMPLE II | EXAMPLE III |
| --- | --- | --- | --- |
| Viscosity of Transfer Ink | 4000 cps | 4500 cps | 5000 cps |
| Pin holes | a few | almost none | None |
| Adhesiveness | 15 sec | 50 sec | 1 min |
| Appearance after Transfer | Polished | Polished | Polished |
| Thickness of Ink Coating | 7–8 μm | 7–8 μm | 9–10 μm |
| Transfer Efficiency | 90–95% | 90–95% | 90–97% |

Pin holes were observed with the naked eye or with the aid of a microscope with a magnifying power of 25 times. As for the adhesiveness, it was determined in such a way that, after a balance weight of 50 g was attached to the under-side of the printing film, when the film was lifted up to a height of 1 m, there were measured the times which it took for the balance weight to fall down from the film. The transfer efficiency was determined by the transferred state after the printing film 100 $cm^2$ was transferred to carbon steel.

Over the conventional embossing processes in which a photoresist is sprayed on a L mold and photomasking is conducted, followed by transferring, as described hereinbefore, the present invention has advantages in that it is simple, has a reduced number of process steps and yields products at low costs.

The present invention has been described in an illustrative manner, and it is to be understood that the terminology used is intended to be in the nature of description rather than of limitation. Many modifications and variations of the present invention are possible in light of the above teaching. Therefore, it is to be understood that within the scope of the appended claims, the invention may be practiced otherwise than as specifically described herein.

What is claimed is:

1. A UV-transfer ink, comprising 20–40% by weight of a UV-reactive ink wherein, said ink comprises 15–25% by weight of pigment, 3–4% by weight of polyethylene wax, 0.5–5.0% by weight of a bulking agent, 12–16% by weight of a curing agent, 15–25% by weight of polyester acrylate, 10–12% by weight of an acrylic monomer, 25–36% by weight of aliphatic urethane diacrylate, and 1.5–2.0% by weight of trimethylpropane triacrylate; 20–40% by weight of an acrylic (co) polymer, 4–6% by weight of an ethylene vinyl acetate copolymer, 25–35% of an organic solvent, wherein the weight ratio of the UV-reactive ink to a mixture of the acrylic (co) polymer, the ethylene vinyl acetate (co) polymer, the organic solvent and the bulking agent ranges from 20:80 to 50:50.

2. A UV-curable transfer ink as set forth in claim 1, wherein the acrylic (co) polymer is polymethylmethacrylate.

3. A UV-curable transfer ink as set forth in claim 1, wherein the organic solvent is selected from the group consisting of toluene, cyclohexane, methyl salicylate, butyl acetate, ethyl acetate, amyl acetate, isopropyl alcohol, methyl isobutyl ketone, methyl ethyl ketone, dibutylphthalate, xylene and benzene.

4. A UV-curable transfer ink as set forth in claim 1, wherein the bulking agent is at least two kinds selected from the group consisting of aluminum oxide, silicon dioxide, mica, kaolin, talc, calcium oxide, barium sulfate, calcium sulfate, alumina and silica.

5. A UV-curable transfer ink as set forth in claim 1, wherein the pigment is cyanium blue, toluidine red or carbon black.

* * * * *